United States Patent Office 3,181,994
Patented May 4, 1965

3,181,994
ANALGESIC BIPHENYL ACETIC ACID DERIVATIVES
Bernard Dubnick, Morris Plains, N.J., assignor to Warner-Lambert Pharmaceutical Company, Morris Plains, N.J., a corporation of Delaware
No Drawing. Filed Nov. 13, 1961, Ser. No. 152,003
4 Claims. (Cl. 167—65)

The present invention relates to new and novel substituted aminoalcohol salts of 2-substituted (4-biphenylyl)acetic acid and to therapeutic compositions thereof, said new and novel salts having the formula

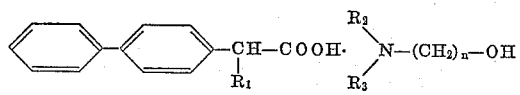

wherein $R_1$ is lower alkyl, $R_2$ and $R_3$ are lower alkyl or when taken with the amino nitrogen atom form a piperidino, pyrrolidino or morpholino group, and $n$ is 1 to 3.

The new and novel salts of this invention have significant pharmacological activity as analgesic agents and exhibit effective activity in the clinic in the relief of pain.

Among the acid moieties entering into the formation of the new and novel salts of this invention are 2-(4-biphenylyl)propionic acid, 2-(4-biphenylyl)butyric acid, 2-(4-biphenylyl)valeric acid, 2-(4-biphenylyl)-2-(n-amyl)acetic acid and the like. Among the basic moieties in these salts are 2-dimethylaminoethanol, 2-diethylaminoethanol, 2-(1-piperidino)ethanol, 2-(1-morpholino)ethanol, 2-(1-pyrrolidino)ethanol, dimethylaminomethanol, diethylaminomethanol, 3-diethylaminopropanol and the like.

The salt of 2-(4-biphenylyl)butyric acid with 2-dimethylaminoethanol is particularly effective as an analgesic agent and this salt is the preferred active ingredient in the analgesic compositions of this invention.

The salts of this invention are readily prepared by the reaction of an acid of the formula

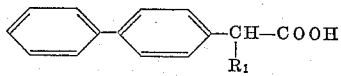

prepared as described in J.A.C.S. 65, pp. 1725–1727, with an aminoalcohol of the formula

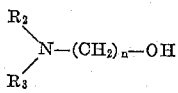

in an inert solvent, such as dry benzene, $R_1$, $R_2$, $R_3$ and $n$ being as described hereinabove.

For therapeutic use, the salts of this invention are combined with conventional inert pharmaceutical carriers to form dosage units such as tablets, capsules, solutions, suspensions, elixirs, suppositories and the like. Each dosage unit should contain about 25 to about 150 milligrams of active ingredient.

The following examples are included in order further to illustrate the present invention:

EXAMPLE 1

To a warm solution of 170 g. 2-(4-biphenylyl)butyric acid in 1400 ml. dry benzene is added a solution of 63.2 g. 2-dimethylaminoethanol in 700 ml. dry benzene. Then, 4.2 l. petroleum ether (boiling range of 30–60° C.) are added and the resulting mixture is chilled. The solids are filtered, washed with petroleum ether and suspended in 1.8 l. warm dry benzene. Petroleum ether is added until turbidity develops and the mixture is chilled overnight. The crystals are filtered, washed with petroleum ether and dried in a desiccator over concentrated sulfuric acid to constant weight.

Yield: 213 g. (90.1%) of the 2-dimethylaminoethanol salt of 2-(4-biphenylyl)butyric acid, M.P. 96–97.5° C.
Analysis—Calc.: C, 72.91; H, 8.26; N, 4.25. Found: C, 72.66; H, 8.26; N, 4.09.

EXAMPLE 2

The following ingredients are blended in the proportions indicated:

|  | Grams |
|---|---|
| (1) 2-dimethylaminoethanol salt of 2-(4-biphenylyl)butyric acid | 25.0 |
| (2) Lactose, U.S.P. | 654.0 |
| (3) Magnesium stearate, U.S.P. | 21.0 |
|  | 700.0 |

Hard gelatin capsules are each filled with 700 mg. of the above mixture, each capsule containing 25 mg. active ingredient.

EXAMPLE 3

The following ingredients are blended in the proportions indicated:

|  | Grams |
|---|---|
| (1) 2-dimethylaminoethanol salt of 2-(4-biphenylyl)butyric acid | 75.0 |
| (2) Lactose, U.S.P. | 510.0 |
| (3) Magnesium stearate, U.S.P. | 15.0 |
|  | 600.0 |

Hard gelatin capsules are each filled with 600 mg. of the above mixture, each capsule containing 75 mg. active ingredient.

EXAMPLE 4

The following ingredients are blended in the proportions indicated:

|  | Grams |
|---|---|
| (1) 2-dimethylaminoethanol salt of 2-(4-biphenylyl)butyric acid | 100.0 |
| (2) Lactose, U.S.P. | 485.0 |
| (3) Magnesium stearate, U.S.P. | 15.0 |
|  | 600.0 |

Hard gelatin capsules are each filled with 600 mg. of the above mixture, each capsule containing 100 mg. active ingredient.

The new and novel salts of my invention have unexpected analgesic activity not predictable from the activities of the acid and basic moieties which are reacted to form the salts. This is clearly revealed by the results of a detailed pharmacological investigation of the 2-dimethylaminoethanol salt of 2-(4-biphenylyl)butyric acid which shows that this salt has an unexpectedly high analgesic potency and therapeutic index as compared to either the acid or basic moieties alone, an equimolar mixture of these moieties, or the ester formed by esterification of the acid moiety (as the acid chloride) with the basic aminoalcohol moiety.

In the investigation, the following procedures are employed:

Analgesic potency ($ED_{50}$)

The proceedure best suited to the determination of the analgesic activity of a compound is a modification of that described by E. A. Siegmund et al., J. Pharmacol. & Exper. Therap., 119, 184 (1957). Female mice weighing 18 to 24 grams are used. The "writhing syndrome," which is characterized by periodic twisting of the lower half of the trunk, contractions of the muscles in the pelvic area and extension of the hind legs with elevation of the base of the tail, is produced by the intra-peritoneal injection of 0.25 cc. of a 0.02% solution of phenyl-p-quinone in 5% ethyl alcohol. All mice writhe within 10 minutes after administration of phenyl-p-quinone. In carrying out the test, three groups of ten mice each are used. A different dose of the analgesic to be investigated is administered orally to each group. 15 minutes later, each group is challenged with phenylquinone. A dose responsive curve is obtained by basing observations on an all-or-none response during the 10 minute period after injection of phenylquinone. The amount of the analgesic, expressed as milligrams per kilogram of body weight at which 50% of the test mice show no writhing is determined from the dose response curve and reported as the $ED_{50}$ (effective dose) for the material being studied. This test procedure affords a reliable and convenient method for evaluating the analgesic properties of various compounds. The lower the $ED_{50}$, the more effective the material is as an analgesic.

*Acute oral toxicity* ($LD_{50}$)

The acute oral toxicity for a compound is measured in mice and represents the single oral dose expressed in milligrams per kilogram of body weight at which 50 percent of a test group of mice die.

From the foregoing two values, the therapeutic index for a compound is calculated by dividing the $LD_{50}$ value by the $ED_{50}$ value. The therapeutic index is a measure of the relative safety of a drug, the larger the therapeutic index, the greater the safety.

The following table summarizes the results of the investigation made on the following materials:

(1) The 2-dimethylaminoethanol salt of 2-(4-biphenylyl) butyric acid, the compound of this invention prepared as described in Example 1.
(2) 2-dimethylaminoethanol, the basic moiety used in formation of the salt.
(3) 2-(4-biphenylyl)butyric acid, the acid moiety used in formation of the salt.
(4) 2-dimethylaminoethyl 2-(4-biphenylyl)butyrate, the ester formed by esterification of 2-(4-biphenylyl)butyric acid as its acid chloride with 2-dimethylaminoethanol by the procedure described in U.S. Patent 2,410,040.

TABLE

| Material Tested | $ED_{50}$ | $LD_{50}$ | Therapeutic Index |
|---|---|---|---|
| 1 | 21 | >1,000 | >47.5 |
| 2 | >12,000 | | |
| 3 | 50 | 690 | 13.8 |
| 4 | 100 | 675 | 6.75 |

The above results show that the salt of this invention (1) has over twice the analgesic activity and over three times the therapeutic index of the acid moiety (3). This result is truly unexpected in view of the fact that the basic moiety (2) is essentially devoid of any analgesic activity whatever. Furthermore, a test of a physical mixture of the acid and basic moieties in equimolar proportions reveals that the mixture possesses only the additive analgesic effects of the two moieties.

A comparison of the salt of this invention (1) with the corresponding ester (4) again reveals unexpected superiority the salt possessing almost five times the analgesic activity and over seven times the therapeutic index of the ester.

It is understood that the foregoing detailed description is given merely by way of illustration and that many variations may be made therein without departing from the spirit of my invention.

Having described my invention, what I desire to secure by Letters Patent is:

1. Method for the production of analgesia in mammals which comprises the administration to said mammals an effective amount of the 2-dimethylaminoethanol salt of 2-(4-biphenylyl)butyric acid.

2. Method for the production of analgesia in mammals which comprises the administration to said mammals about 25 to about 150 mg. of the 2-dimethylaminoethanol salt of 2-(4-biphenylyl)butyric acid in combination with an inert pharmaceutical carrier.

3. A therapeutic analgesic composition in dosage unit form consisting essentially of an inert pharmaceutical carrier and about 25 to about 150 milligrams per unit of a compound of the formula

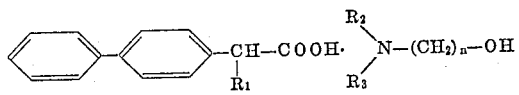

wherein $R_1$ is lower alkyl, $R_2$ and $R_3$ are members selected from the group consisting of lower alkyl groups and when taken with the amino nitrogen atom form a member selected from the group consisting of piperidino pyrrolidino and morpholino groups, and $n$ is 1 to 3.

4. A composition according to claim 3 wherein said compound is the 2-dimethylaminoethanol salt of 2-(4-biphenylyl)butyric acid.

References Cited by the Examiner
UNITED STATES PATENTS

| | | | |
|---|---|---|---|
| 2,144,552 | 1/39 | Shovle | 260—501 |
| 2,675,405 | 4/54 | Carrara | 260—501 |
| 2,742,397 | 4/56 | Ott | 167—65 |
| 2,866,814 | 12/58 | Fischback | 260—501 |
| 2,874,185 | 2/59 | Sowa | 260—501 |
| 3,004,889 | 10/61 | Kuna | 167—65 |
| 3,088,871 | 5/63 | Pfeiffer | 167—65 |

OTHER REFERENCES

Cavallini: J. Am. Chem. Soc., vol. 79, pp. 3514–3517, 1957.

Cavallini et al.: J. Am. Chem. Soc., vol. 81, May 20, 1959, pp. 2564–2567.

LEWIS GOTTS, *Primary Examiner.*

M. O. WOLK, F. CACCIAPAGLIA, JR., *Examiners.*